United States Patent [19]

Schlosser

[11] Patent Number: 5,289,194
[45] Date of Patent: Feb. 22, 1994

[54] COMBINER FOR TWO DIMENSIONAL ADAPTIVE INTERFERENCE SUPPRESSION SYSTEM

[75] Inventor: Thomas W. Schlosser, San Diego, Calif.

[73] Assignee: The United States of America as represented by the Secretary of the Navy, Washington, D.C.

[21] Appl. No.: 904,109

[22] Filed: Jun. 25, 1992

[51] Int. Cl.[5] .............................................. H04B 1/10
[52] U.S. Cl. ................................... 342/378; 364/572; 364/574; 364/724.01; 364/724.12; 375/99; 375/102; 375/103; 455/63; 455/67.3; 455/278.1; 455/296
[58] Field of Search ................ 342/378; 364/572, 574, 364/724.01, 724.12; 375/14, 99, 102, 103, 1; 455/50.1, 63, 67.3, 278.1, 296, 305; 380/6, 34

[56] References Cited

U.S. PATENT DOCUMENTS

| | | | |
|---|---|---|---|
| 4,255,791 | 3/1981 | Martin | 364/514 |
| 4,320,535 | 3/1982 | Brady et al. | 455/278.1 |
| 4,408,332 | 10/1983 | Sari | 375/14 |
| 4,464,768 | 8/1984 | Lewis et al. | 375/101 |
| 4,475,215 | 10/1984 | Gutleber | 375/34 |
| 4,587,620 | 5/1986 | Niimi et al. | 364/574 |
| 4,613,978 | 9/1986 | Kurth et al. | 375/99 |
| 4,893,350 | 1/1990 | Minamisono et al. | 455/278.1 |
| 5,052,027 | 9/1991 | Poklemba et al. | 375/103 |

OTHER PUBLICATIONS

J. Bond and T. Schlosser, "Adaptive Locally Optimum Detection Based Upon Kernel Estimation", *NOSC Technical Report 1307*, San Diego, Calif., Aug. 1989, pp. 1–19.

*Primary Examiner*—Bernarr E. Gregory
*Attorney, Agent, or Firm*—Harvey Fendelman; Thomas Glenn Keough; Peter A. Lipovsky

[57] ABSTRACT

A multisignal combiner is provided for weighting the best performing signal of an amplitude transform signal and a phase difference transform signal produced by a processor which receives a two dimensional signal and has intermediate signals which are a variance of the amplitude and a variance of the phase difference of the received signal. A device is provided for receiving the variance of the amplitude and the variance of the phase difference for producing a pair of weighting factors, each of which is inversely proportional to the size of the variances of the respective values, and a third weighting factor which is 1 minus the weighting factor of the signal which has the smallest variance. The transformed signals are weighted by the weighting factors and the received signal is weighted by the third weighting factor. The weighted signals are then summed to provide a final output signal which has it's best performing signal component enhanced relative to the other signal components.

7 Claims, 8 Drawing Sheets

COMBINER FOR TWO DIMENSIONAL ADAPTIVE INTERFERENCE SUPPRESSION SYSTEM

STATEMENT OF GOVERNMENT INTEREST invention described herein may be manufactured and used by or for the Government of the United States of America for governmental purposes without the payment of any royalties thereon or therefor.

DOCUMENTS INCORPORATED BY REFERENCE

This application is related to two previously filed patent applications: "Kernel Adaptive Interference Suppression System" filed on May 29, 1991 by James W. Bond, David J. Marchette, Carey E. Priebe and Thomas W. Schlosser, and given Ser. No. 07/707,352; and "Two-Dimensional Kernel Adaptive Interference Suppression System" filed on May 29, 1991 by James W. Bond, David J. Marchette, Carey E. Priebe and Thomas W. Schlosser, and given Ser. No. 07/707,354.

BACKGROUND OF THE INVENTION

The invention relates to a multisignal combiner for weighting and summing outputs of a two dimensional signal processor so that the output having the best desired signal performance is given the greatest weight.

In the preferred embodiment, the invention is used as a multisignal combiner for weighting the outputs of the two dimensional kernel adaptive interferference suppression system, described in the latter mentioned patent application, according to their performances. This system uses an Adaptive Locally Optimum Detection (ALOD) algorithm which was created especially for interference suppression. This two dimensional suppression system of the prior filed patent application will be referred to hereinafter as the ALOD Processor or Processor. The ALOD algorithm implements kernel estimation to attempt to represent the joint probability density function of two random variables (magnitude and phase-difference) based upon a finite number of data points (signal samples). The algorithm provides an estimate of interference statistics based on such things as atmospheric noise, jamming and other communication signals, so that the received signal samples may be transformed into perceptible communication signals.

The ALOD Processor calculates and outputs two transforms, one based on the amplitude and the other based on the change in phase of received signal samples. These two outputs are then combined with a bleed through path signal from a radio receiver to produce a final output signal which best represents the desired communication signal. Unfortunately, there are signal environments where one or neither of the transform outputs enhance the desired communication signal relative to interference. There are some instances where they may actually degrade the communication signal levels relative to noise levels.

While testing the ALOD Processor I discovered that the performance of each transform output was linked to the value of its corresponding variance. When the variance of the amplitude samples was small, the amplitude transform output provided excellent interference suppression. When it was large, it could actually degrade the communication signal. The same held true for the phase difference transform. When the variance of the phase difference samples was small, the phase difference transform output provided excellent interference suppression. When it was large there could be a degrading of the communication signal. It was this discovery that led to the present invention.

SUMMARY OF THE INVENTION

The present invention is a combiner for weighting and summing outputs from a two dimensional signal processor, such as the ALOD Processor, with the greatest weight being applied to the output signal which has the best signal performance. The ALOD Processor receives in phase and quadrature samples from a radio (communication) receiver and produces two intermediate results which are: (1) the variance of amplitude of the received signal and (2) the variance of the phase difference of the received signal. The invention receives the variance of the amplitude and the variance of the phase difference for producing a pair of weighted factors which are inversely proportional to the degree of variances of the respective received signals. The output amplitude transform signal and the output phase difference transform signal are then multiplied by the respective weighting factor to produce a weighted amplitude transform signal and a weighted phase difference transform signal. These weighted transform signals are then combined to produce a final output transform signal which has it's best performing signal component enhanced relative to the other component. "Best" is defined herein as most likely to succeed at suppressing inteference in a recieved signal. In another preferred embodiment of the invention the bleed through path signal is also combined with the other weighted transform signals after it is multiplied by a weighting factor which is calculated from the other two weighting factors. Other embodiments of the invention include novel additions which still further enhance the final output transform signal.

OBJECTS OF THE INVENTION

An object of the present invention is to overcome the aforementioned problems associated the two dimensional signal processors.

Another object is to provide a multisignal combiner for weighting the best performing output signal of a two dimensional signal processor.

A further object is to provide a multisignal combiner for weighting the best performing signal of an amplitude transform signal and a phase difference transform signal and then summing these weighted signals to produce a final output transform signal which has it's best performing signal component enhanced relative to the other component.

Still another object is to provide a combiner as stated in the previous object, but which will in addition weight a bleed through path signal based upon the performances of the other two weighted signals and then combine the weighted bleed through path signal with the other two weighted signals t provide a final best output transform signal.

Still a further object is to provide a combiner as stated in the aforementioned object but which will in addition weight any of the transform signals to be weighted at zero if it doesn't come up to a predetermined signal performance standard.

These and other objects of the invention will become more readily apparent from the ensuing specifications when taken together with the drawings.

DESCRIPTION OF THE PREFERRED EMBODIMENTS

Figure 1:
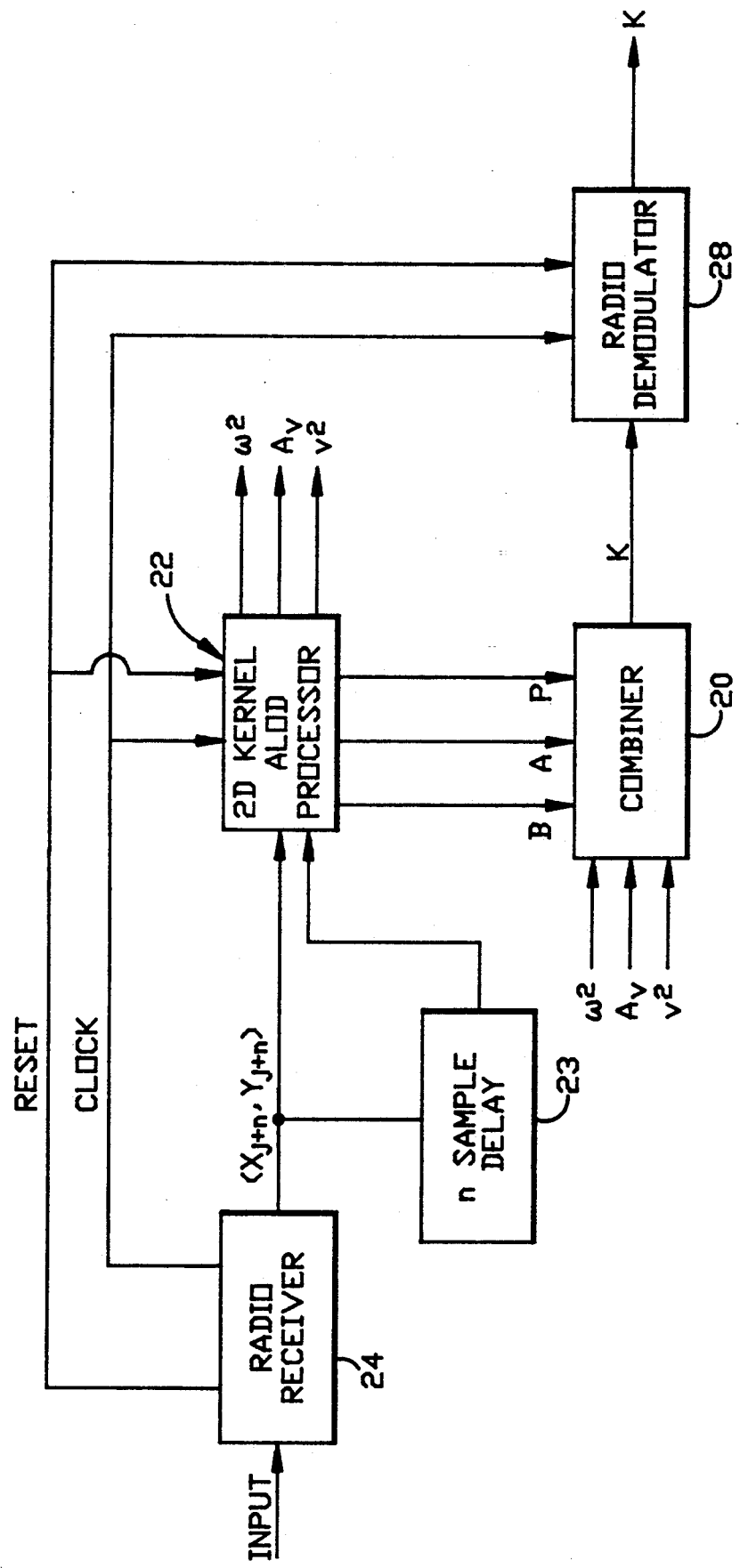
FIG. 1 is a block diagram of the Combiner (present invention) being used in conjunction with other signal processors.

Referring now to the drawings wherein like reference numerals designate like or similar parts throughout the several views there is shown in FIG. 1 the Combiner 20 which weights and sums the output transform signals A and P of a two dimensional signal processor, such as the 2 D Kernel ALOD Processor 22, referred to hereafter as the ALOD Processor or Processor, where A is an amplitude transform signal and P is a phase difference transform signal. Via an "n" sample delay 23 the ALOD Processor 22 receives in phase and quadrature samples $x_{j+n}, y_{j+n}$ from a radio receiver 24. After scaling in a coordinate normalizer 25, FIG. 2, the ALOD Processor 22 feeds these samples as a bleed-through path signal B of the radio receiver 24 to the Combiner 20. The "n" sample delay simulates the delay of the signals processed through the ALOD Processor 22. The radio receiver 24 feeds clock and reset signals to the ALOD Processor 22 and a radio demodulator 28 for performing respective synchronization and reinitialization when the radio receiver 24 is changed in frequency.

As will be explained in detail, the Combiner 20 also receives intermediate output signals from the ALOD Processor, namely: (1) variance of the amplitude $\omega^2$, (2) average amplitude $A_v$ and (3) variance of the phase difference $v^2$. After weighting the amplitude transform signal A, the phase difference transform signal P and the bleed through path signal B, the Combiner 20 sums these signals and outputs to the radio demodulator 28 a final transform signal K which has it's best performing signal component enhanced relative to the other components.

In order to understand how the ALOD Processor 22, shown in detail in FIG. 2, produces the variance of amplitude $\omega^2$, the average amplitude $A_v$ and the variance of phase difference $v^2$ as intermediate signals, certain portions of the ALOD Processor 22 will be explained with the aid of FIGS. 3-5. This will be done prior to describing the present invention, namely; the Combiner 20.

Figure 2:
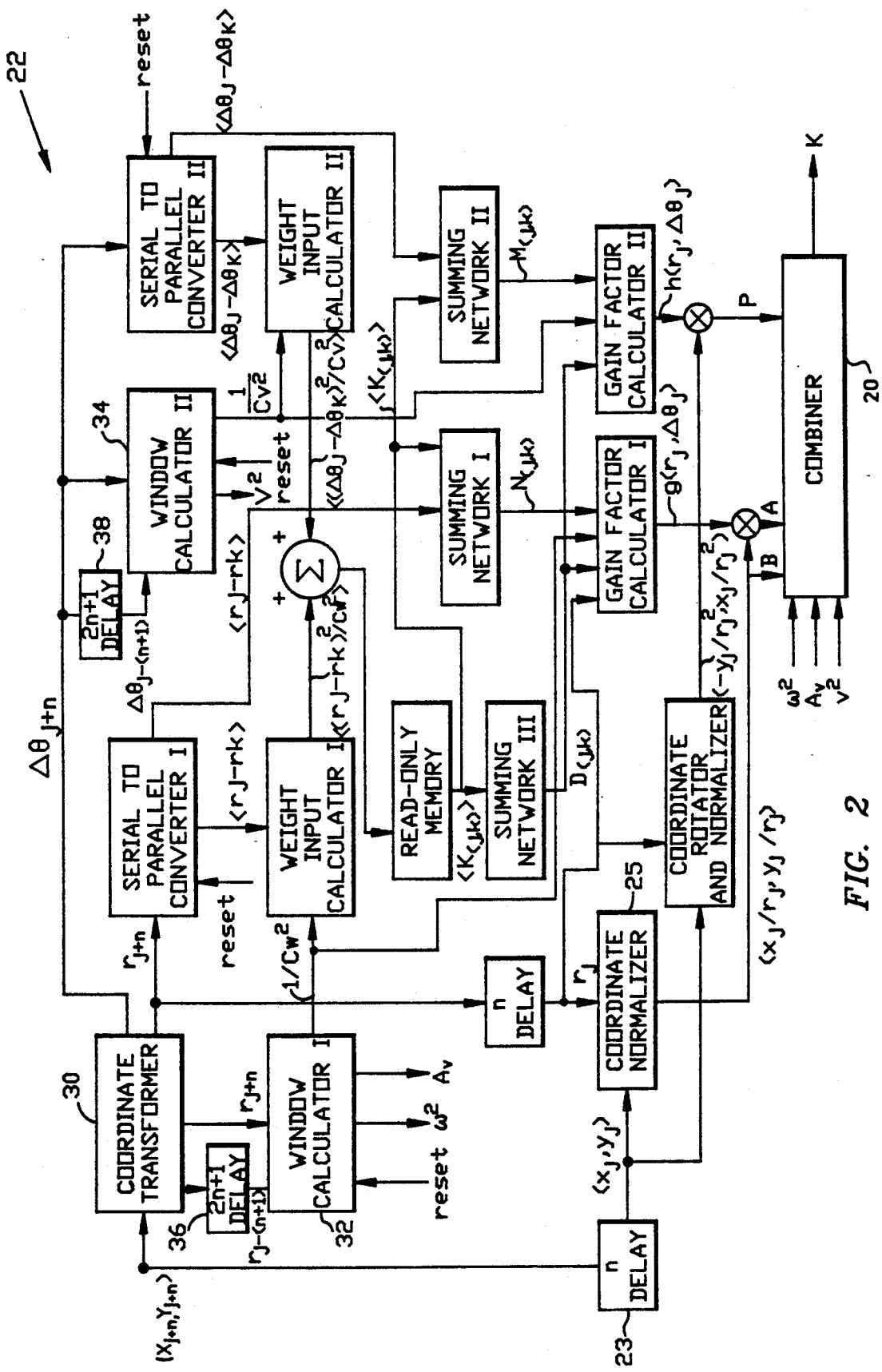
FIG. 2 is a block diagram of the ALOD Processor set forth in the latter mentioned patent application with the invention shown as a Combiner for it's outputs.
Figure 3:
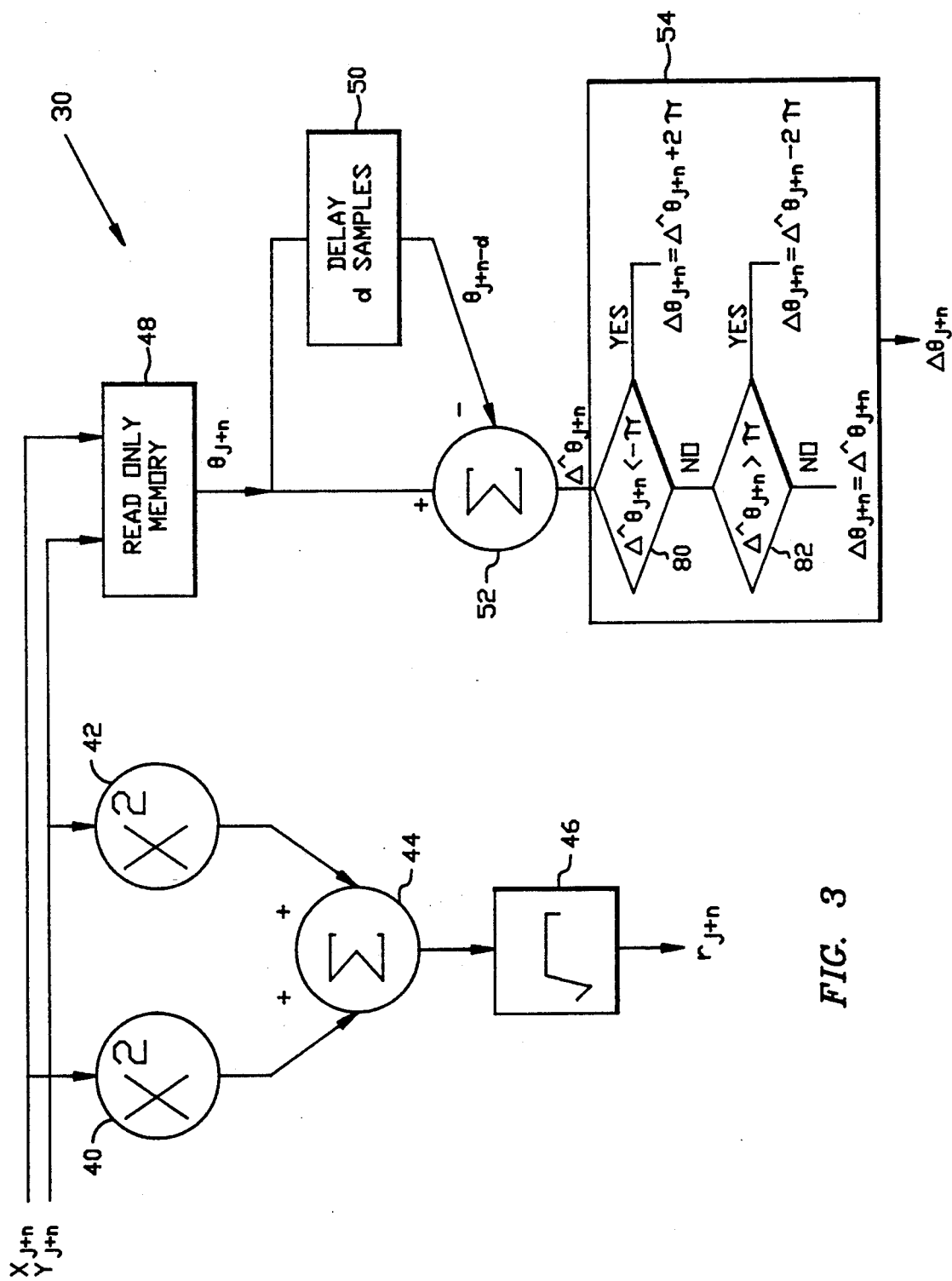
FIG. 3 is a block diagram of the coordinate transformer of the ALOD Processor.
Figure 4:
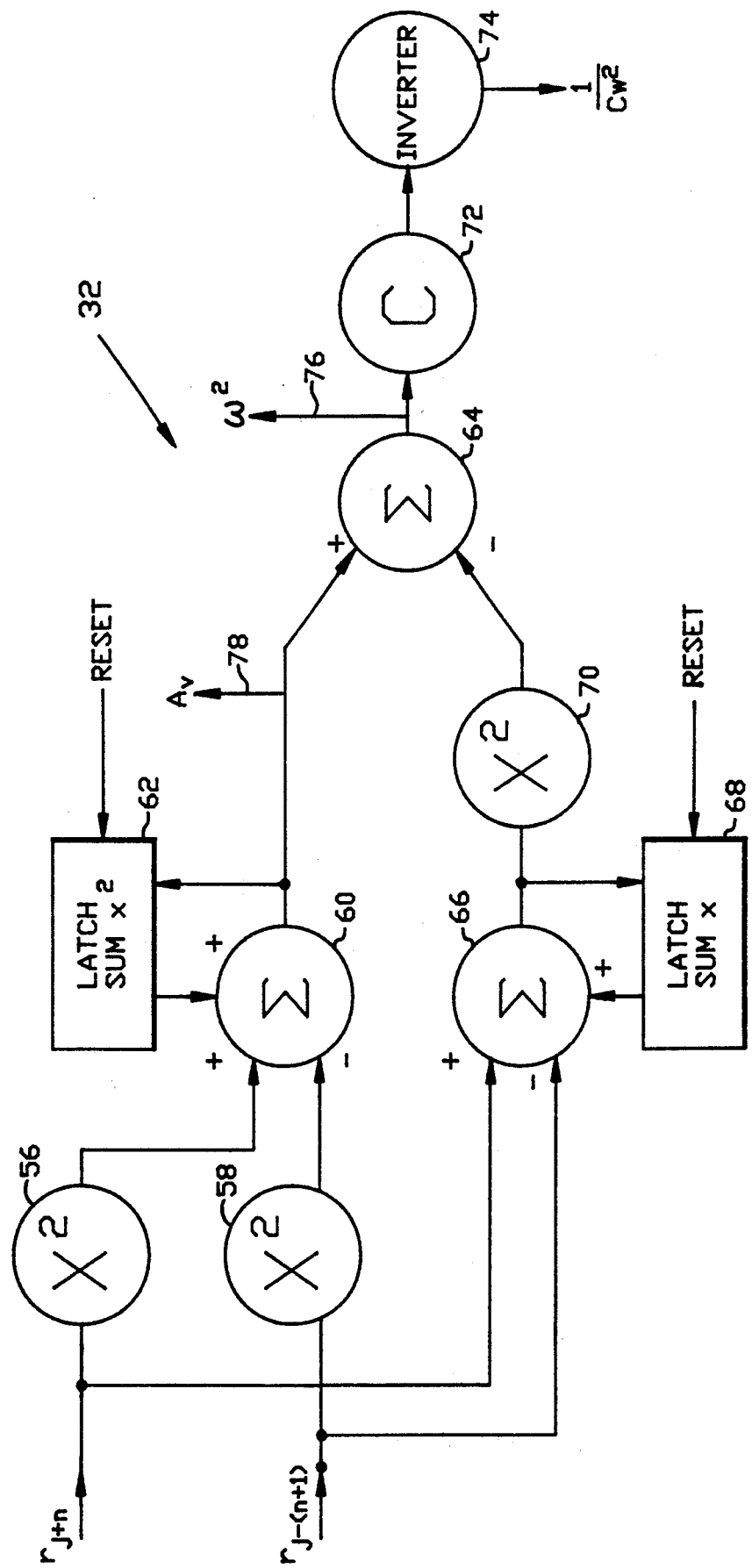
FIG. 4 is a block diagram of the first window calculator of the ALOD Processor.
Figure 5:
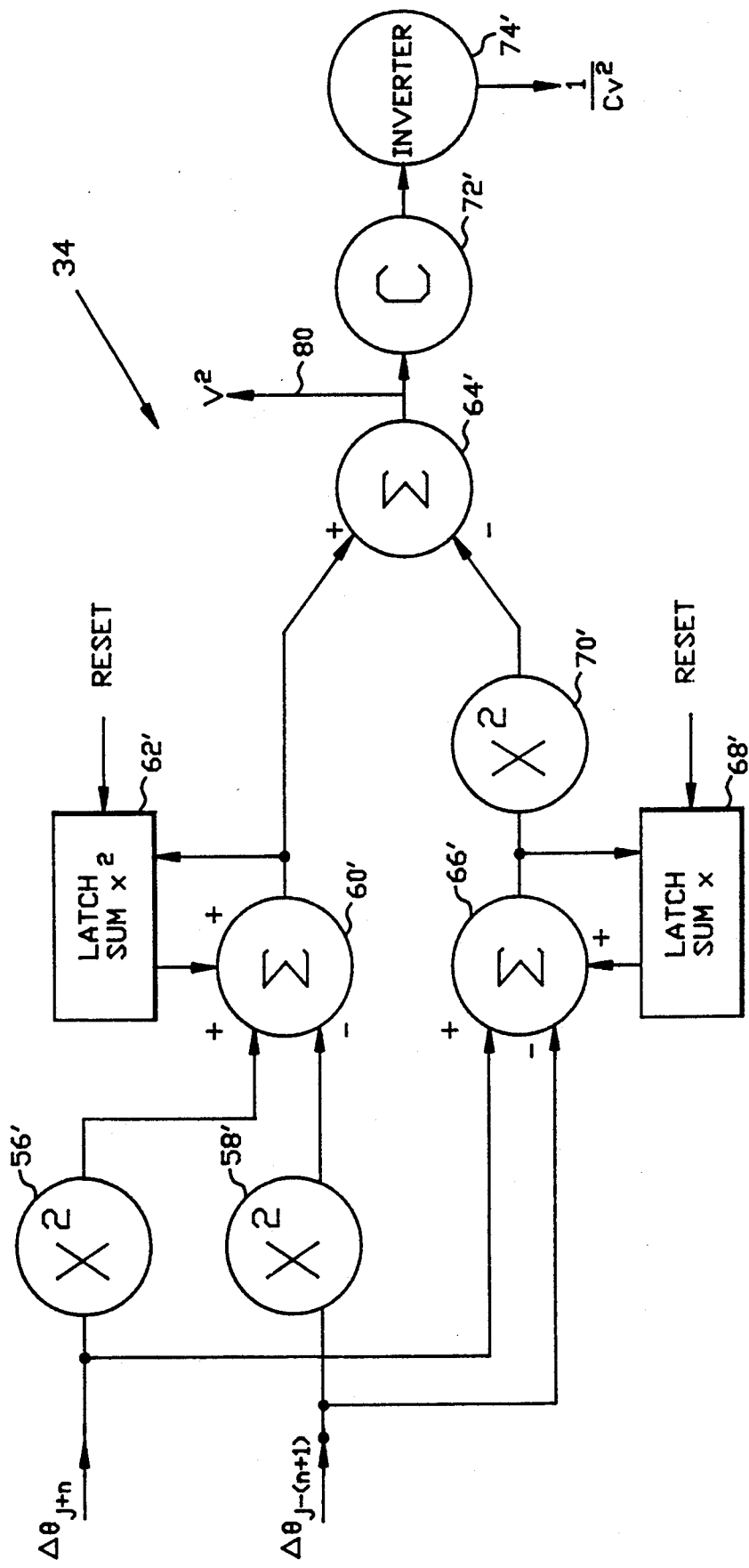
FIG. 5 is a block diagram of the second window calculator of the ALOD Processor.

As shown in FIG. 2, pertinent ALOD Processor portions are the coordinate transformer 30, shown in more detail in FIG. 3, the first and second window calculators 32 and 34, shown in more detail in FIGS. 4 and 5, respectively, and the 2n+1 delays 36 and 38 shown only in FIG. 2.

Reference is now made to FIG. 3 where there is shown the coordinate transformer portion 30 of the ALOD Processor 22. Each component of the sample input pair $(x_{j+n}, y_{j+n})$ from the radio receiver 24 is fed to a squaring circuit 40 and 42 respectively. The squaring circuit outputs are added in a summer 44 and the square root is taken in square root processor 46 to give the magnitude (amplitude) signal $r_{j+n}$ of the signal sample $(x_{j+n}, y_{j+n})$. As shown in FIGS. 2 and 3, the $r_{j+n}$ signal is then routed directly and via the 2n+1 delay 36 to a first window calculator 32. Again referring to FIG. 3, a sequence of vectors $<x_j, y_j>$ of which $(x_{j+n}, y_{j+n})$ are a part, is used to address a read-only memory 48. For each of the vectors addressing the memory 48, there is a principal value of arctan $(y_j/x_j)$ stored and output from the memory. For the particular vector $(x_{j+n}, y_{j+n})$, the value of arctan $(y_{j+n}/x_{j+n})$ will be stored at the $(x_{j+n}, y_{j+n})$ address. A delay 50 permits the value of $\theta_{j+n-d}$ to be subtracted from the output of the memory 48 in a summer 52 to provide $\Delta^{\wedge}\theta_{j+n}$. If this difference does not fall between $-\pi$ and $\pi$ it is compared in logic circuit 54 with these values and adjusted by multiples of $2\pi$ if necessary. As shown in FIGS. 2 and 3, one of three outputs of comparator 54 is routed directly and via 2n+1 delay 38 to the second window calculator 34.

As can be seen from FIG. 4 the first window calculator 32 receives the (j+n)th amplitude value $r_{j+n}$ and via the 2n+1 sample delay 36 receives a delayed amplitude $r_{j-(n+1)}$. With these values the first window calculator produces an estimation of variance, that is the square of the standard deviation of the received samples, of the joint PDF as a function of signal magnitude, in this case signal amplitude. This variance is calculated recursively. As shown in FIG. 4, the sample magnitude signals $r_{j+n}$ and $r_{j-(n+1)}$ are fed to squaring circuits 56 and 58 respectively. The output of squaring circuit 56 is added in summer 60 to the negative of the output of the squaring circuit 58. The output of summer 60 is latched into latch 62 and is also routed to a summer 64.

The aforementioned amplitude samples $r_{j+n}$ and $r_{j-(n+1)}$ are also fed to a summer 66 where positive and negative values of the samples, respectively, are added. The output of the summer 66 is latched to latch 68 and is also passed to squaring circuit 70. The positive and negative values of the sum $x^2$ and (sum $x)^2$, respectively, are added in the summer 64 and the output is multiplied by a constant C at 72. This produces an estimated variance $C\omega^2$ that is passed through an inverter 74 to produce an output $1/C\omega^2$.

It is important to note that for purposes of the present invention that a variance of the amplitude $\omega^2$ and an average amplitude $A_v$ are produced as byproducts of the first window calculator 32. The variance of the amplitude $\omega^2$ is produced on the line 76 between the summer 64 and constant generator 72, and the average amplitude $A_v$ is produced on line 78 between the summer 60 and the summer 64.

In operation, the window calculator 32 stores the last used sum $x^2$ and the sum x. These values are used to estimate the window employed in the calculation of the previously used gain factor. These values are then updated by using the samples $r_{j+n}$ and $r_{j-(n+1)}$ in the following manner:

$$\text{sum } x^2_{new} \rightarrow \text{sum } x^2_{old} + r_{j+n}^2 - r_{r-(n+1)}^2$$

$$\text{sum } x_{new} \rightarrow \text{sum } x_{old} + r_{j+n} - r_{j-(n+1)}.$$

An estimate of the variance of the received amplitude values are then obtained by forming:

$$\text{sum } x^2 - (\text{sum } x)^2.$$

From the radio receiver 24 the reset signal is routed to the latches 62 and 68, holding values sum $x^2$ and the sum x respectively, to set their contents to zero. This restarts the process of calculating the variance of the received amplitude values when the radio receiver is tuned to a new frequency.

As shown in FIGS. 2 and 5, the second window calculator 34 receives the signal $\Delta\theta_{j+n}$ from the coordinate transformer 24 and receives via the $2n+1$ delay 38 a signal $\Delta\theta_{j-(n+1)}$. This calculator also receives the reset signal from the radio receiver. The second window calculator 34 has the same components and operates in the same manner as the first window calculator 32 shown in FIG. 4. The only difference are the values produced. In second window calculator 34 the output signal is $1/Cv^2$, where $v^2$ is the vaiance of the phase difference $\Delta\theta_j$ and C is the aforementioned constant. The value $v^2$, which is employed by the present invention, is produced as a byproduct of the second window calculator 34 on a line 80 between the summer 64' and the constant generator 72'.

The value of C above is taken to be any positive value and can be experimented with to find an optimum value for a particular system. Where C(n) denotes the value of C when n samples on each side of $(r_{j\Delta\theta j})$ are used to estimate magnitude and phase-difference statistics, the following values for C give effective performance: C(4)=0.45, C(8)=0.32, C(16)=0.28 and C(32)=0.24.

Figure 6:
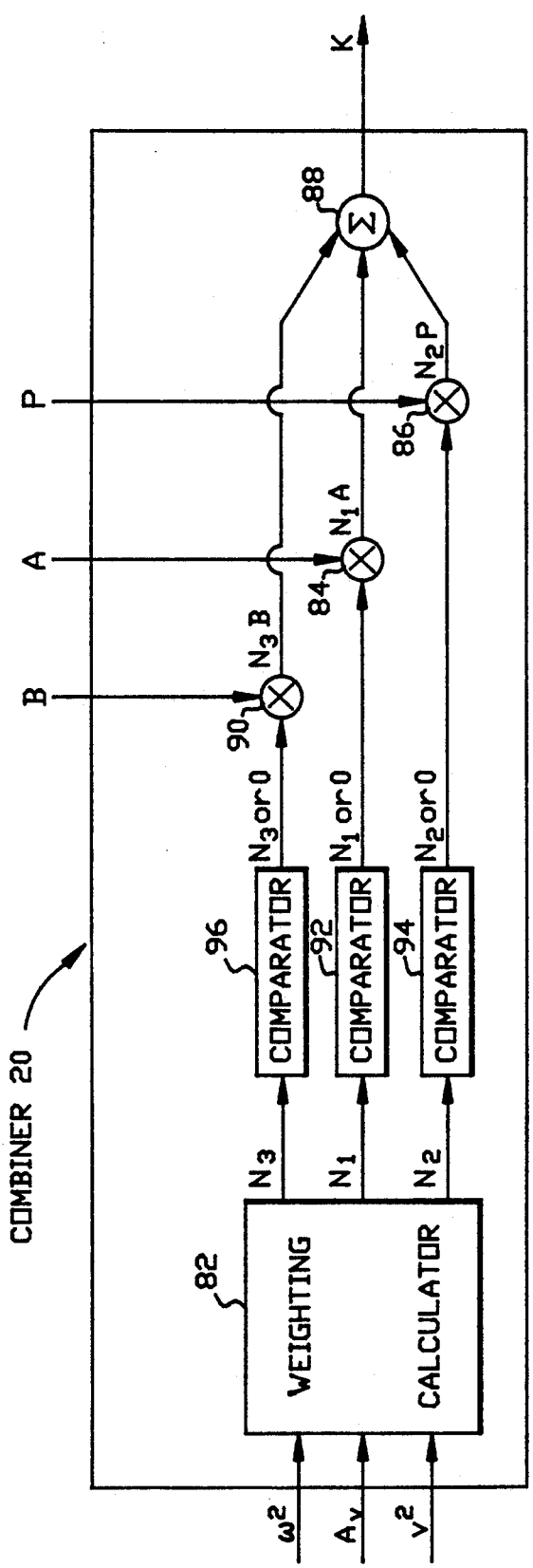
FIG. 6 is an overall block diagram of the present invention (Combiner) receiving two transform signals (A and P) from the ALOD Processor and a bleed through path signal (B) from a radio receiver via the ALOD Processor.

Exemplary signals have now been described which are required inputs for the operation of the present invention, namely the combiner 20, shown in an overall block diagram in FIG. 6 and in detail in FIGS. 7 through 10. To recap, the input signals to the combiner 20 are as follows: (1) variance of the amplitude $\omega^2$ and average amplitude $A_v$ from the first window calculator 32, (2) variance of the phase difference $v^2$ from the second window calculator 34, (3) amplitude transform A and phase difference transform P from the ALOD Processor 22 and (4) a bleed through path B from the radio receiver 24 via the n sample delay 23 and the coordinate normalizer 25.

The combiner 20 weights the amplitude transform signal A and the phase difference transform signal P according to their performance in providing a desired signal free of interference, and then produces a final output transform signal K which has it's best performing signal component enhanced relative to the other component. In a preferred embodiment of the invention the Combiner 20 also weights the bleed through path signal B and includes this weighted signal in the final output transform signal K.

As shown in FIG. 6 the Combiner 20 includes: (1) means receiving the variance of the amplitude $\omega^2$ for producing weighting factor N which is inversely proportional to the variance of the amplitude $\omega^2$, and (2) means receiving the variance of the phase difference $v^2$ for producing a weighting factor $N_2$ which is inversely proportional to the variance of the phase difference $v^2$. The functions of both weighting factor means may be accomplished by a weighting calculator 82 which receives the variance of the amplitude $\omega^2$ and the variance of the phase difference $v^2$ and, after appropriated calculations, produces weighting factors $N_1$ and $N_2$. In a preferred embodiment there is also provided means receiving the average amplitude $A_v$ for scaling the variance of the amplitude $\omega^2$ prior to producing the weighting factor $N_1$. The function of the scaling means may also be accomplished by the weighting calculator 82 which receives the average amplitude $A_v$ as an input signal and, after appropriate calculations, produces weighting factor $N_1$. The weighting calculator 82 will be described in detail hereinafter.

Still referring to FIG. 6 the Combiner 20 includes means multiplying the weighting factor $N_1$ times the amplitude transform signal A to produce a weighted amplitude transform signal $N_1A$. This multiplying means may be a multiplier 84 which receives the factor $N_1$ and the amplitude transform signal A and multiplies them to produce the weighted amplitude transform signal $N_1A$. Also, there is provided a means multiplying the weighting factor $N_2$ times the phase difference transform signal P to produce a weighted phase difference transform signal $N_2P$. The function of the last multiplying means may be accomplished by a multiplier 86 which receives the weighting factor $N_2$ and the variance of the phase difference P and multiplies these signals to produce the weighted signal $N_2P$. The Combiner 20 further includes means for summing the weighted signals $N_1A$ and $N_2P$ to produce a final output transform signal K which is most representative of the desired signal received from the radio receiver 24. This summing means may be a summer 88 which receives the signals $N_1A$ and $N_2P$ and sums these signals to produce the signal K.

In a preferred embodiment of the invention the Combiner 20 receives the bleed through path signal B from the radio receiver 24. In this embodiment, means calculating 1 minus the greater of the weighting factors $N_1$ or $N_2$ produces a weighting factor $N_3$. This calculation may be accomplished by the weighting calculator 82. The preferred embodiment further includes means multiplying the weighting factor $N_3$ times the bleed through path signal B to produce a weighted bleed through path signal $N_3B$. The function of this weighting means may be accomplished by a multiplier 90 which receives the weighting factor $N_3$ and the bleed through path signal B and multiplies these signals to produce the weighted signal $N_3B$. This weighted signal is then fed to the Summer 88 where it is summed along with the other weighted signals $N_1A$ and $N_2P$ to produce the final output transform signal K. It is possible that the bleed through path signal B may be the best performing signal. In such a case the above described processing of the bleed through path signal B is necessary to produce the best signal K.

Since any one of the weighting factors $N_1$, $N_2$ or $N_3$ may degrade the desired output signal K when summed in the summer 86 it is desirable to provide first second and third comparator means which receive the weighting factors $N_1$, $N_2$ and $N_3$ respectively for passing any one of the weighting factors $N_1$, $N_2$ or $N_3$ to the respective multiplier 84, 86 or 90 if it's value is above a predetermined threshold Z and for producing zero or no output if it's value falls below the predetermined threshold Z. The functions of the first, second and third comparator means may be accomplished by comparators 92, 94 and 96 respectively which will be described in more detail herinafter.

Figure 7:
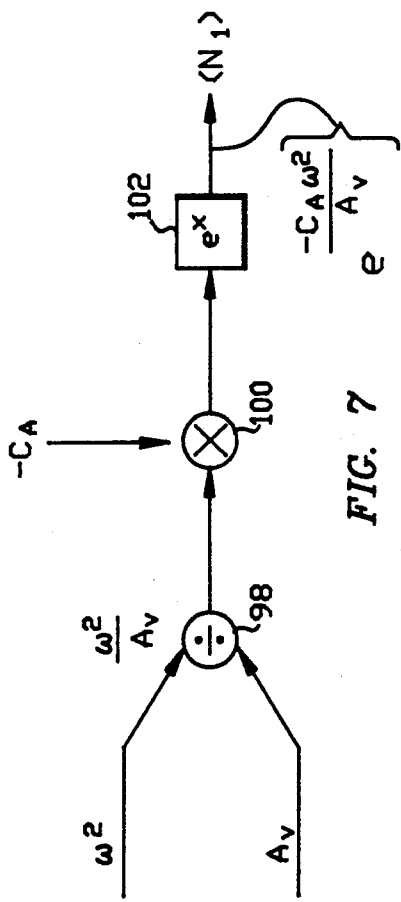
FIG. 7 is a block diagram of an exemplary device for calculating the weighting factor to be multiplied times the amplitude transform signal (A).

The aforementioned weighting factor $N_1$ producing means of the weighting calculator 82 may, as shown in FIG. 7, include means, such as divider 98, for dividing $\omega^2$ by $A_v$ to produce $\omega^2/A_v$. This value is then fed to a means, such as a multiplier 100, which also receives a minus constant $-C_A$, for multiplying $\omega^2/A_v$ times the minus constant to produce $-C_A\omega^2/A_v$. This signal is then fed to a means, such as $e^x$ calculator 102, for exponentially applying $-C_A\omega^2/A_v$ to produce $e^{-C_A W2/A_v}$ which is the weighting factor $N_1$.

Figure 8:
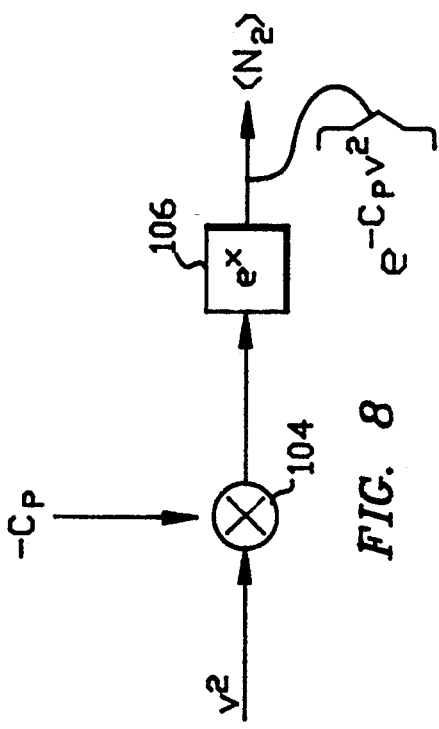
FIG. 8 is a block diagram of an exemplary device for calculating the weighting factor to be multiplied times the phase difference transform signal (P).

The aforementioned weighting factor $N_2$ producing means of the weighting calculator 82 may, as shown in FIG. 8, include means, such as multiplier 104, for multiplying $v^2$ times a minus constant $-C_P$ to produce $-C_P v^2$. This signal is then fed to an $e^x$ calculcator 106 for applying $-C_P V^2$ as an exponent to e to produce a $e^{-C_P v^2}$ which is weighting factor $N_2$.

It should be understood that large values of $C_A$ will produce smaller values of $N_1$ and that smaller values of $C_A$ will produce larger values of $N_1$. The same holds true of $C_P$ and $N_2$. The user can easily determine the optimal settings through experimentation for their particular application. I found that setting $C_A$ and $C_P$ each equal to 4 worked well for many VLF signal environments.

Figure 9:
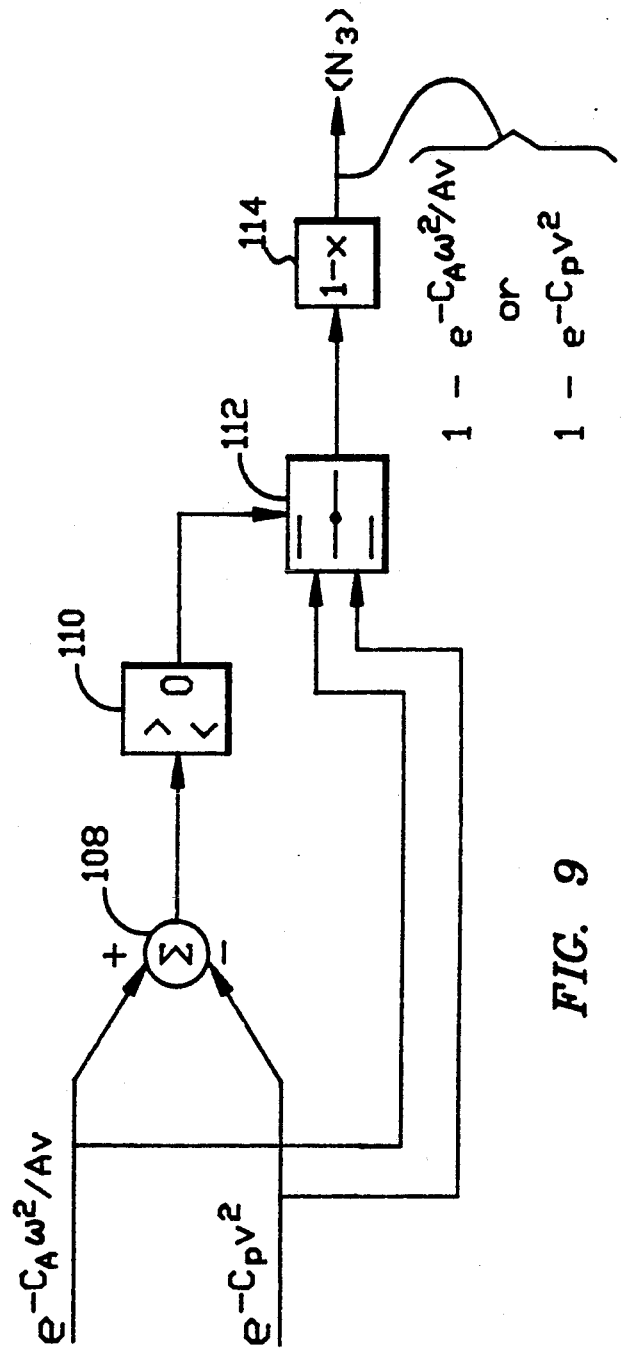
FIG. 9 is a block diagram of an exemplary device for calculating the weighting factor to be multiplied times the bleed through path signal (B).
Figure 10:
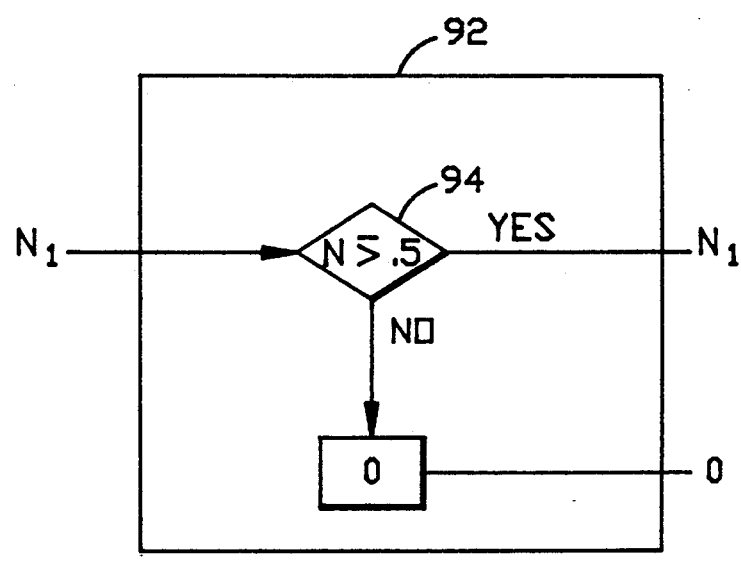
FIG. 10 is a block diagram of an exemplary device for weighting any one of the signals to be weighted at zero if the signal does not come up to a predetermined signal performance standard.

The aforementioned weighting factor $N_3$ producing means of the weighting calculator 82, may, as shown in FIG. 9, include means, such as summer 108 for summing $e^{-C_A W2/A_v}$ and the negative of $e^{-C_P v^2}$ to produce a plus or minus signal. A plus signal would indicate that $e^{-C_A W2/A_v}$ is the greatest while a minus signal would indicate that $e^{-C_P v^2}$ is the greatest. The plus or minus signal is sent via a greater than or less than calculator 110 to a means, such as a switch 112, for receiving and passing the greatest of the $e^{-C_A W2/A_v}$ or $e^{-C_P v^2}$. The greatest value is then sent to means, such as $1-x$ calculator 114 which subtracts the greatest value from 1 to produce $1-e^{-C_A W2/A_v}$ or $1-e^{-C_P v^2}$. In either event the difference is the weighting factor $N_3$.

The aforementioned comparators 92, 94, and 96, shown in FIG. 6, for rejecting weighting factors $N_1$, $N_2$, and $N_3$ which are not up to a predetermined performance are the same in structure and function. One of such comparators 92 is shown in more detail in FIG. 10 and is exemplary of the other comparators 94 and 96. The comparator 92 receives the weighting factor $N_1$ and passes the signal $N_1$ if it is equal to or above a threshold signal level Z, such as 0.5, or producing a zero output if the weighting factor $N_1$ is below that level. In this manner any one of the signals A, P or B will be weighted at zero and not used if it's performance will degrade the desired output signal K. Other threshold signal levels could be set anywhere between 0.1 to 0.5 depending upon which threshold signal level gives the best results. It has been found that setting Z equal to 0.2 provided good results for a variety of VLF signal environments.

OPERATION OF THE INVENTION

The essence of the invention is that when the variance of the amplitude $\omega^2$ or the variance of the phase difference $v^2$ is small, then the performance of either of the transforms using these values is likely to be better than if the respective variance is large. Several examples ma illustrate how the invention operates. First, let's assume the the variance of the amplitude $\omega^2$ and the variance of the phase difference $v^2$ to be very small. In this example the weighting factors $N_1$ and $N_2$ would each be close to one, giving maximum weight to transform signals A and P and minimum weight to the bleed through signal B. In another example assume the variance of the amplitude $\omega^2$ and the variance of the phase difference $v^2$ are both very large. In this example small, possibly zero, weighting factors $N_1$ and $N_2$ would be applied to the signals A and P and a maximum weighting factor $N_3$ would be applied to the bleed through path signal B. In a further example assume that the the variance of the amplitude $\omega^2$ is very small and the variance of the phase difference $v^2$ is very large. Then a large weighting factor $N_1$ would be applied to the signal A and small, possibly zero, weighting factors $N_2$ and $N_3$ would be applied to signal P and the bleed through path signal B respectively. The same analysis would hold true if the variance of the phase difference $v^2$ was small and the variance of the amplitude $\omega^2$ was large. Then the signal P would be enhanced relative to the signals A and B which would be limited or zeroed out.

Obviously, many modifications and variations of the present invention are possible in the light of the above teachings. It is therefore to be understood that within the scope of the appended claims, the invention may be practiced otherwise than as specifically described.

What is claimed is:

1. A multisignal enhancement combiner system comprising:

a radio receiver for converting received signals into in-phase and quadrature samples of the received signals;

a signal processor for receiving the in-phase and quadrature samples from the radio receiver, the signal processor producing an amplitude transform signal A and a phase difference transform signal P and producing intermediate signals of the received signals including a variance of amplitude signal $\omega^2$ and a variance of phase difference signal $v^2$;

a first weighting signal generator receiving the variance of amplitude signal $\omega^2$ for producing a weighting signal $N_1$ which is inversely proportional to the variance of amplitude signal $\omega^2$;

a second weighting signal generator receiving the variance of phase difference signal $v^2$ for producing a weighting signal $N_2$ which is inversely proportional to the variance of phase difference signal $v^2$;

a first multiplier for multiplying the weighting signal $N_1$ times the amplitude transform signal A to produce a weighted transform signal $N_1A$;

a second multiplier for multiplying the weighting signal $N_2$ times the phase difference transform signal P to produce a weighted phase difference transform signal $N_2P$;

a summer for summing the weighted signals $N_1A$ and $N_2P$ to produce a final output transform signal K whose best performing signal component is enhanced, the final output transform signal K being inserted into a radio demodulator to output interference suppressed signals.

2. A combiner as claimed in claim 1 in which:

the first weighting signal generator also receives an average amplitude signal $A_v$ for scaling the variance of the amplitude signal $\omega^2$ before producing the weighting signal $N_1$.

3. A combiner as claimed in claim 2 further including a first comparator receiving the weighting signal $N_1$ for passing the weighting signal $N_1$ to the first multiplier if the value of weighting signal $N_1$ is above a predetermined weighted threshold value Z and for producing a zero output if the value of weighting signal $N_1$ is below the predetermined threshold value Z; and a second comparator receiving the weighting signal $N_2$ for passing the weighting signal $N_2$ to the second multiplier if the value of the weighting signal $N_2$ is above said predetermined threshold value Z and for producing a zero output if the value of weighting signal $N_2$ is below the predetermined threshold value Z.

4. A combiner as claimed in claim 2 wherein the signal processor scales the in-phase and quadrature samples for the radio receiver to produce a bleed through path signal B, the combiner further including:

a third weighting signal generator receiving the weighting signals $N_1$ and $N_2$ for producing a weighting signal $N_3$ which is 1 minus the greater of the two weighting signals $N_1$ and $N_2$; and a third multiplier for multiplying the weighting signal $N_3$ times the bleed through path signal B to produce a weighted signal $N_3B$;

the weighted signal summer also summing the weighted bleed through path signal $N_3B$ with the other weighted signals $N_1A$ and $N_2P$ to produce the final output transform signal K.

5. A combiner as claimed in claim 4 wherein:

the first weighting signal generator for producing weighting signal $N_1$ includes:

a divider for dividing the variance of amplitude signal by average amplitude signal $A_v$ to produce a signal of value $\omega^2/A_v$;

a multiplier for multiplying the signal of value $\omega^2/A_v$ times a minus constant signal $-C_A$ to produce a signal of value $-C_A\omega^2/A_v$; and an exponential multiplier for applying the signal of value $-C_A\omega^2/A_v$ as an exponent of e to produce the signal of value $e^{-C_A W2/A_v}$ which is the weighting signal $N_1$;

the second weighting signal generator for producing the weighting signal $N_2$ includes:

a multiplier for multiplying the variance of amplitude signal $v^2$ times a minus constant $-C_P$ to produce a signal of value $-C_P v^2$, which is the weighting signal $N_2$; and the third weighting signal generator for producing the weighting signal $N_3$ includes:

a summer for summing the signals of values $e^{-C_A W2/Av}$ and $e^{-C_P v2}$ to produce a summed signal;

a comparator for comparing the signals of values $e^{-C_A W2/Av}$ and $e^{-C_P v2}$ and the summed signal to produce the greater of these signal values;; and a subtractor for subtracting from 1 the greater of the signals of values $e^{-C_A W2/Av}$ and $e^{-C_P v2}$ to produce the weighting signal $N_3$.

6. A combiner as claimed in claim 5 including:

first, second and third comparators receiving weighting signals $N_1$, $N_2$, $N_3$ respectively and operably coupled to said first, second and third multipliers, respectively for passing a respective weighting signal to a respective multiplying means if the respective weighting signal has a value above said predetermined threshold value Z and for producing a zero output if the respective weighting signal has a value is below this predetermined threshold value Z.

7. A combiner as claimed in claim 6 including:

the constants $C_A$ and $C_P$ are each equal to 4.

* * * * *